(12) United States Patent  
Li

(10) Patent No.: US 7,460,495 B2
(45) Date of Patent: Dec. 2, 2008

(54) SERVERLESS PEER-TO-PEER MULTI-PARTY REAL-TIME AUDIO COMMUNICATION SYSTEM AND METHOD

(75) Inventor: Jin Li, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 566 days.

(21) Appl. No.: 11/066,137

(22) Filed: Feb. 23, 2005

(65) Prior Publication Data

US 2006/0187860 A1   Aug. 24, 2006

(51) Int. Cl.
  H04L 12/16 (2006.01)
  H04Q 11/00 (2006.01)
  H04L 12/66 (2006.01)
  G06F 15/16 (2006.01)
  G10L 21/00 (2006.01)
(52) U.S. Cl. .................................... 370/267; 370/352
(58) Field of Classification Search ................. 370/260
   See application file for complete search history.

(56) References Cited

U.S. PATENT DOCUMENTS

| 7,158,487 B1* | 1/2007 | Klaghofer et al. ........... 370/261 |
| 2002/0126626 A1* | 9/2002 | Singh et al. ................. 370/260 |
| 2002/0126685 A1* | 9/2002 | Leatherbury et al. ........ 370/432 |
| 2002/0133764 A1* | 9/2002 | Wang ........................... 714/707 |
| 2002/0178260 A1* | 11/2002 | Chang ........................ 709/225 |
| 2003/0115050 A1* | 6/2003 | Chen et al. .................. 704/230 |
| 2003/0182001 A1* | 9/2003 | Radenkovic et al. ........... 700/94 |
| 2004/0078622 A1* | 4/2004 | Kaminsky et al. .............. 714/4 |
| 2004/0165541 A1 | 8/2004 | Scholte |
| 2005/0094579 A1* | 5/2005 | Acharya et al. ............. 370/260 |

FOREIGN PATENT DOCUMENTS

EP   1246395   2/2002

OTHER PUBLICATIONS

European Search Report, Application No. EP6100434, completed Mar. 28, 2006, received Apr. 10, 2006.

(Continued)

*Primary Examiner*—Chau Nguyen
*Assistant Examiner*—Andrew Chriss
(74) *Attorney, Agent, or Firm*—Lyon & Harr, L.L.P.; Craig S. Fischer

(57) ABSTRACT

A serverless peer-to-peer (P2P) multi-party real-time audio communication system and method in which each of the peers takes a turn mixing and compressing the audio and redelivering the compressed audio. An input audio stream is divided or split into frames. At each frame, one peer node is selected to mix and redeliver the audio to the remainder of the peers in the network. The number of frames mixed and redelivered by a certain peer is proportional to its available resources (such as the upload bandwidth or computational power). The P2P audio communication system and method flexibly balances the load of the peers, such that peers having more resources are able to assist peers having fewer resources. This enables the P2P audio communication system and method to conduct a multi-party audio communication session without the need for powerful servers or peers.

20 Claims, 11 Drawing Sheets

OTHER PUBLICATIONS

Co-pending U.S. Appl. No. 10/887,406 entitled "Efficient One-to-Many Content Distribution in a Peer-to-Peer Computer Network" by J. Li, P. Chou, and C. Zhang, filed on Jul. 7, 2004.

G.722.1, "Coding at 24 and 32 kbit/s for hands-free operation in systems with low frame loss".

Lennox, J., Schulzrinne, H., "A protocol for reliable decentralized conferencing", *In Proc of 13th international workshop on network and operating systems support for digital audio and video*, (NOSSDAV'2003), pp. 72-81, 2003, Monterey, California.

Li, J., Chou, P. A., and Zhang, C., "Mutualcast: An Efficient Mechanism for Content Distribution in a Peer-to-Peer (P2P) Network", MSR-TR-2004-100, Sep. 2004.

Radenkovic, M., Greenhalgh, C., and Benford, S., "Deployment issues for multi-user audio support in CVEs", *In Proc. ACM Symp. On Virtual Reality Software and Technology*, pp. 179-185, 2002, Hong Kong, China.

Singh, K., Nair, G., and Schulzrinne, H., "Centralized Conferencing using SIP", *In Proc of the 2nd IP-Telephony Workshop*, Apr. 2001.

* cited by examiner

SERVERLESS PEER-TO-PEER MULTI-PARTY REAL-TIME AUDIO COMMUNICATION SYSTEM AND METHOD

TECHNICAL FIELD

The present invention relates in general to computer networking and more particularly to a serverless peer-to-peer (P2P) multi-party real-time audio communication system and method in which each of the peers takes a turn mixing the audio and redelivering the compressed audio, wherein the number of audio frames mixed and redelivered by a certain peer is proportional to its available resources (such as the upload bandwidth or computational power).

BACKGROUND OF THE INVENTION

A multi-party audio communication system enables a group of people to engage in a real-time audio communication session. In addition, the system allows multiple people to be speaking at the same time. Besides the audio components of the two-party audio communication system (such as audio capture, acoustic echo cancellation (AEC), automatic gain control (AGC), and audio/speech compression), the multi-party audio communication system poses unique challenges in audio mixing and network delivery.

By way of example, assume that n number of peer computers (or peers) are engaged in a multi-party audio communication session, with possible multiple concurrent speakers. Further assume that each stream of audio requires a bandwidth of bw. The multi-party audio communication system may be formed with a variety of topologies and mixing strategies. One popular topology is a star topology, as shown in FIG. 1A. A powerful central server, S, receives audio streams from all peers ($t_1$, $t_2$, $t_3$, $t_4$, and $t_5$), mixes the audio streams, and sends the mixed and re-encoded audio back to all peers.

The advantage of the star topology is that each peer uses the same hardware as that of a two-party communication system, and thus needs no modification. Only the server needs to be redesigned to support a multi-party communication session. Consequently, the star topology is a popular choice for commercial multi-party communication solutions. One such system is set forth in a paper by K. Singh, G. Nair, and H. Schulzrinne entitled "Centralized Conferencing using SIP" in *Proceedings of the 2$^{nd}$ IP Telephony Workshop*, April 2001. The main shortcoming of the start topology is that a heavy computation and bandwidth burden is placed on the server, S. The server, S, needs to receive n streams of compressed audio (with n·bw download bandwidth), decode, mix and re-encode them, and send the mixed audio back to n peers (n·bw upload bandwidth).

A second common topology is a fully connected unicast network, as shown in FIG. 1B. In a fully connected network, every peer is connected to every other peer in the network. An example of this type of topology is discussed in a paper by J. Lennox and H. Schulzrinne entitled "A protocol for reliable decentralized conferencing" in *Proceedings of the 13$^{th}$ international workshop on network and operating systems support for digital audio and video*, (NOSS-DAV'2003), pp. 72-81, 2003, Monterey, Calif. In this topology, the peers ($t_1$, $t_2$, $t_3$, $t_4$, and $t_5$) do not perform any audio mixing or redelivery. Instead, each speaker simply sends the compressed audio to every other peer. In such a topology, each peer needs (n−1)·bw upload bandwidth to send the audio to the rest of the peer, and a maximum of (n−1)·bw download bandwidth to receive the incoming audio. One disadvantage of this topology is the large increase in network traffic, which places a large burden on each peer and the entire network.

A third possible topology is a generic graph that uses end system mixing. An example of this type of topology is shown in FIG. 1C and in a paper by M. Radenkovic, C. Greenhalgh, and S. Benford entitled "Deployment issues for multi-user audio support in CVEs" in *Proceedings ACM Symposium on virtual reality software and technology*, pp. 179-185, 2002, Hong Kong, China. As shown in FIG. 1C, in this example peers a, b, f and g are leaf nodes, and do not perform any mixing operations. The peers c, d and e serve as a gateway node, which mixes and redelivers the audio for the nearby peers. In general, a gateway node with m neighbors requires m·bw upload and download bandwidth to receive and redeliver the audio. Since m is usually much smaller than n, the design of this topology scales well to a large conferencing session. Nevertheless, the disadvantage of this topology is that the burden on the gateway node can be heavy. Another disadvantage is that as the chain of gateways becomes long, the latency in audio delivery increases. Yet another disadvantage is that the audio may also lose synchronization along the chain of delivery.

A network level solution to further reduce the traffic in an audio communication session is through IP multicast. In IP multicast, a single packet that is transmitted from a source is duplicated at routers along a distribution tree rooted at the source. In this manner, content is delivered to an arbitrary number of receivers. For example, in the star topology shown in FIG. 1A, a peer may still send the compressed audio to the server via unicast. However, the server, S, can multicast the mixed and re-encoded audio back to n peers. A sample implementation of such system can be found in a paper entitled "ConferenceXP: wireless classrooms, collaboration and distance learning". The upload bandwidth of the server, S, is reduced to bw.

One disadvantage, however, of IP multicast is that the requirement on the download bandwidth of the server remains unchanged at n·bw. In the fully connected network shown in FIG. 1B, each speaker may also multicast the compressed audio to every other peer in the network. Again, the disadvantage of the IP multicast for the fully connected network is that while the upload bandwidth of the peer is reduced to bw, the download bandwidth of the peer remain unchanged at (n−1)·bw. Another disadvantage of IP multicast is that its deployment is slow in the real world because of issues such as inter-domain routing protocols, ISP business models (charging models), congestion control along the distribution tree, and security, among other things. As a result, except certain limited university/corporate subnet and network test bed (such as Internet2), native IP multicast support is not widely available. Because of these problems in deploying a network-level multicast service, the vast majority of traffic in the Internet today is unicast based, whereby two computers directly talk to each other.

One type of system and method for one-to-many content distribution for file transfer over a P2P network is described in co-pending patent application U.S. Ser. No. 10/887,406 entitled "Efficient One-to-Many Content Distribution in a Peer-to-Peer Computer Network" by J. Li, P. Chou, and C. Zhang, filed on Jul. 7, 2004. However, that work involved one-to-many file transfer and distribution, whereas an audio communication session involves many-to-many distribution. In addition, that work made extensive use of a TCP/IP queue. However, using a queue is impractical for audio conferencing, because the packets must arrive in a timely manner.

Moreover, audio from different sources may be mixed, which makes audio delivery unique in the audio communication applications.

One disadvantage of existing multi-party audio communication systems is that the mixing and redelivery role played by the peer or server is fixed by the network topology. Another disadvantage of existing audio communication systems is that they perform mixing entire audio streams. Therefore, what is needed is an audio communication system and method that makes the most efficient use of network resources. Moreover, what is needed is a system and method that avoid the disadvantages of the above-described network topologies and is flexible in the mixing and redelivery roles played by the peers. Further, what is needed is an audio communication system and method that performs mixing on frames of audio streams rather than the entire audio streams. Moreover, what is needed is an audio communication system and method that avoid the use of a queue and overcomes the delay problems of file transfer techniques.

SUMMARY OF THE INVENTION

The invention disclosed herein includes a peer-to-peer (P2P) audio communication system and method that provides a real-time multi-party audio communication session for maximum efficiency. A P2P network is a type of network in which each computer generally has equivalent capabilities and responsibilities. The P2P audio communication system and method divides compressed audio into packets and sends each of the packets to a single peer for mixing and redelivery. The number of audio packets mixed and redelivered by a certain peer is proportional to its available resources. These resources may include the upload bandwidth. Alternatively, it may include the computation power. The P2P audio communication system and method reduces the bandwidth required in a multi-party audio communication sessions. Moreover, the P2P audio communication system and method balances the audio serving load with the peer upload bandwidths, and redistributes the cost of a multi-party communication session among all participant peers in the P2P network. This enables the P2P audio communication system and method to conduct a multi-party audio communication session without the need for powerful servers or peers.

Unlike prior techniques, where the mixing and redelivery is based on the network topology, the P2P audio communication system and method disclosed herein splits or divides the compressed audio into packets or frames and lets each peer take a turn mixing and redelivering the audio packets. The P2P audio communication system and method flexibly balances the network bandwidth load of the peers, such that peers having more resources are able to assist those peers having fewer resources. In addition, through audio mixing, the P2P audio communication system and method reduces the bandwidth required to conduct a multi-party, real-time audio communication session.

BRIEF DESCRIPTION OF THE DRAWINGS

The present invention can be further understood by reference to the following description and attached drawings that illustrate aspects of the invention. Other features and advantages will be apparent from the following detailed description of the invention, taken in conjunction with the accompanying drawings, which illustrate, by way of example, the principles of the present invention.

Referring now to the drawings in which like reference numbers represent corresponding parts throughout.

DETAILED DESCRIPTION OF THE INVENTION

In the following description of the invention, reference is made to the accompanying drawings, which form a part thereof, and in which is shown by way of illustration a specific example whereby the invention may be practiced. It is to be understood that other embodiments may be utilized and structural changes may be made without departing from the scope of the present invention.

I. Introduction

Although current one-to-many distribution techniques in peer-to-peer (P2P) computer networks are more efficient than directly sending content from source node to the peer nodes, these techniques fail to achieve the most efficient content distribution in the network. This is due to a number of factors. One factor is that none of these current techniques adequately accounts for and adapts to differences in bandwidth between the peer nodes. Another factor is that these techniques fail to fully utilize the bandwidth capabilities of all of the peer nodes on the network when distributing the content.

The P2P audio communication system and method described herein is a novel solution to conducting a multi-party audio communication session. A key characteristic of the P2P audio communication system and method is that the tasks of audio mixing and redelivering the audio are rotated among the peers in a MutualCast clique. The MutualCast clique includes a small number of peer nodes that form a fully connected mesh. Using the special property of the waveform coded audio that the audio mixing can be performed on the transform domain and on a frame-by-frame basis, the P2P audio communication system and method rotates the mixing and redelivering tasks among the participant peers. This allows sharing of the network bandwidth and computation load. Thus, the P2P audio communication system and method can conduct a multi-party audio communication session without a powerful server.

II. General Overview

Figure 1A:
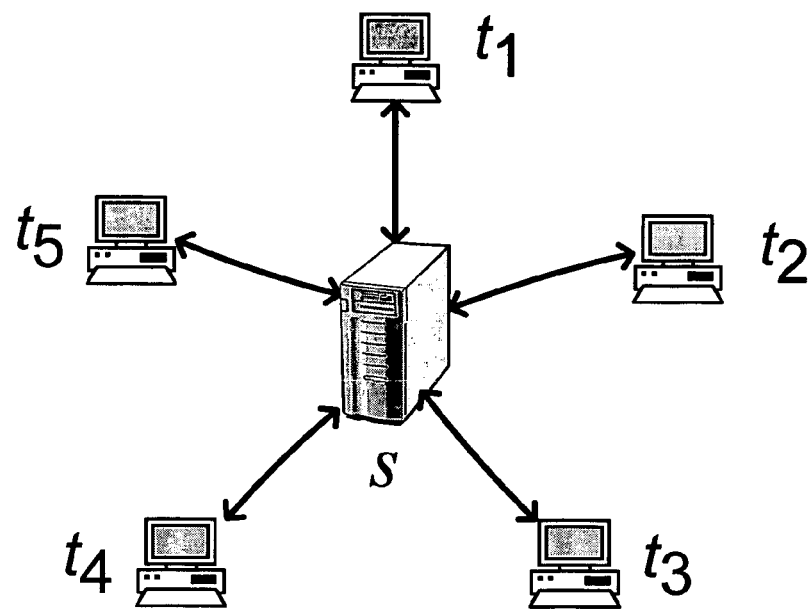
FIG. 1A is a block diagram illustrating a computer network having a star topology.
Figure 1B:
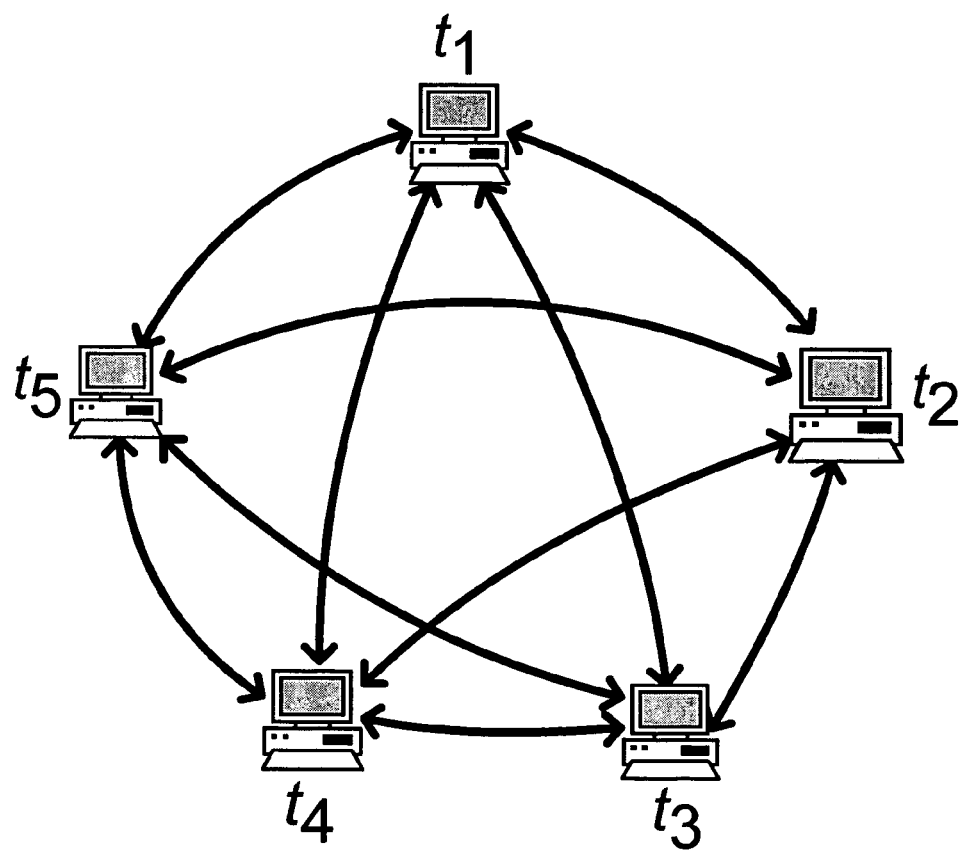
FIG. 1B is a block diagram illustrating a computer network having a fully connected unicast topology.
Figure 1C:
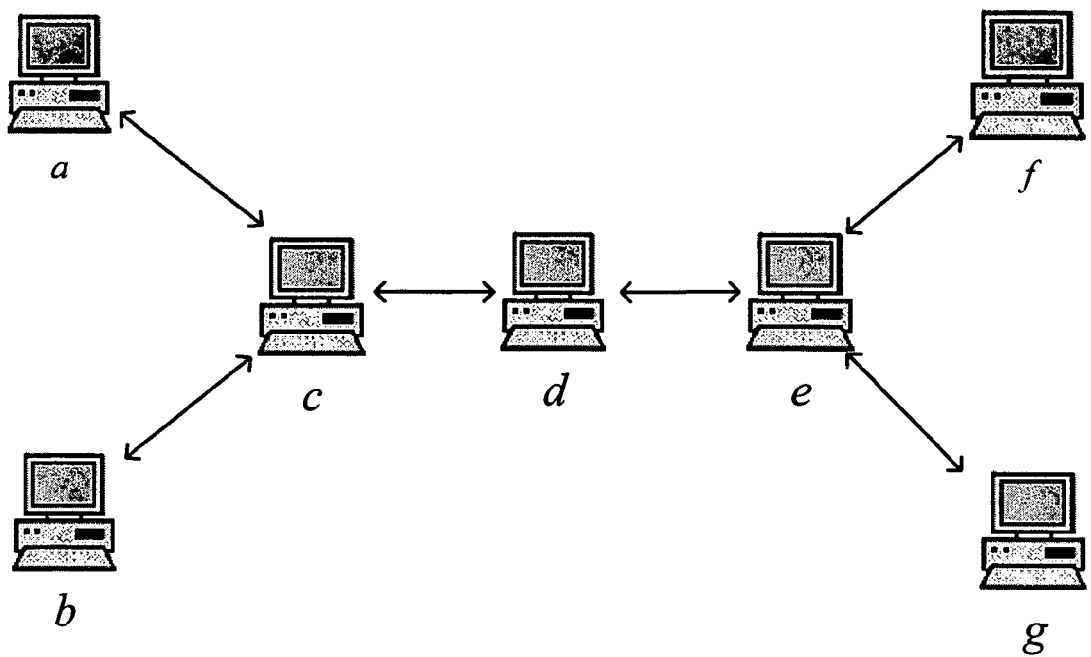
FIG. 1C is a block diagram illustrating a computer network having a generic graph topology using end system mixing.
Figure 2:
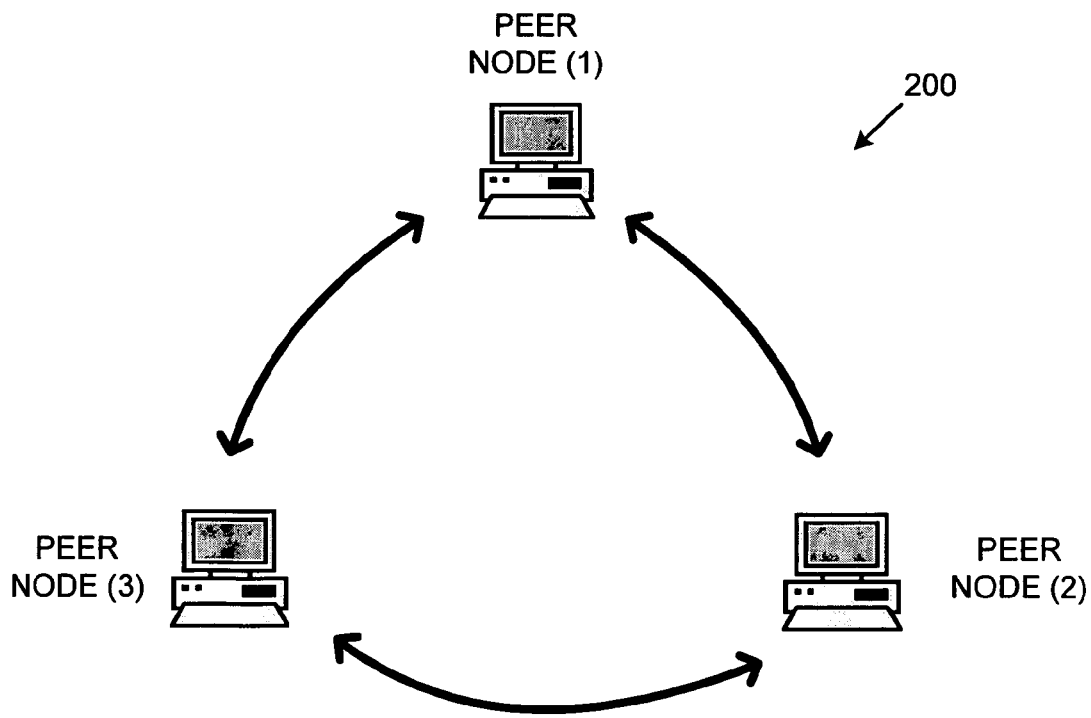
FIG. 2 is a block diagram illustrating an exemplary implementation of the P2P audio communication system and method disclosed herein.

FIG. 2 is a block diagram illustrating an exemplary implementation of the P2P audio communication system and method disclosed herein. It should be noted that FIG. 2 is merely one of several ways in which the P2P audio communication system and method may implemented and used.

Referring to FIG. 2, in this exemplary implementation a fully-connected peer-to-peer (P2P) network 200 is shown. The P2P network 200 that runs uses the P2P audio communication system and method is also called a MutualCast clique. In this exemplary implementation shown in FIG. 2, the MutualCast clique 200 includes three peer nodes, namely peer node (1), peer node (2), and peer node (3). The peer nodes (1), (2), (3), are fully connected, as shown by the arrows. Each of the peer nodes (1), (2), (3), contains the P2P audio communication system and method.

Figure 3:
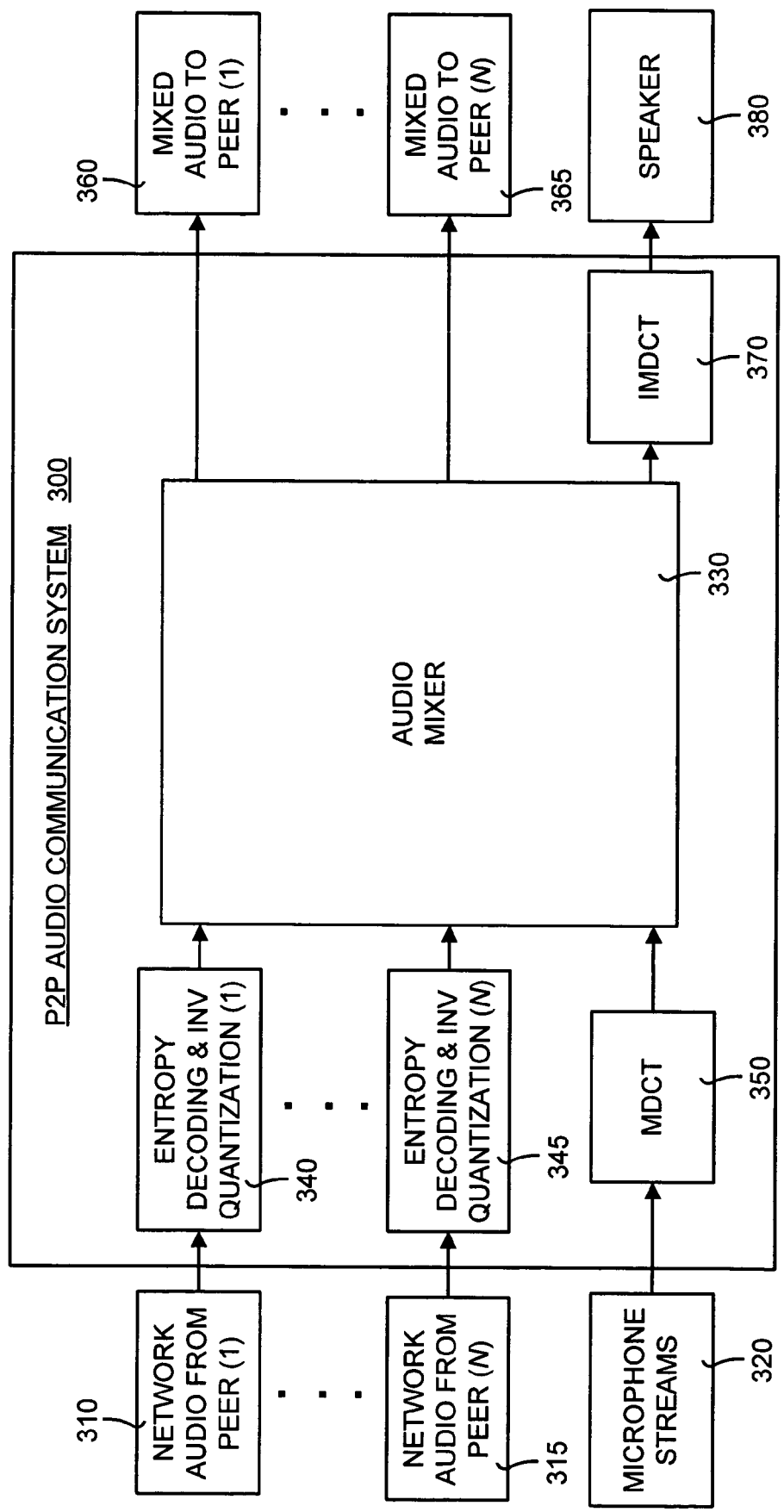
FIG. 3 is a detailed block diagram illustrating a generic exemplary implementation of the P2P audio communication system that is contained on each of the peer nodes as shown in FIG. 2

FIG. 3 is a detailed block diagram illustrating a generic exemplary implementation of the P2P audio communication system 300 that is contained on each of the peer nodes as shown in FIG. 2. In general, referring to FIG. 3, the P2P audio communication system 300 receives network audio from each of the peers and microphone input from a local peer, mixes the audio, and output the mixed audio to the peer nodes as well as the local peer. The local peer node mixes and redelivers the mixed audio. At least some of the peer nodes take turns performing the mixing and redelivery tasks in a round robin manner.

Specifically, FIG. 3 illustrates the P2P audio communication system 300 on the local peer node (not shown). Assume that there are N peer nodes in the P2P network. Input to the system 300 includes network audio from peer (1) 310 to peer (N) 315. The ellipsis in FIG. 3 indicate that not all peer nodes are shown. In addition, microphone streams 320 also are input to the system 300. The microphone streams 320 are from one or more microphones at the local peer. The P2P audio communication system 300 includes an audio mixer 330 that divides the input audio into frames or packets and mixes at a certain frame each of the packets.

The encoded network audio from peer (1) 310 is processed by performing entropy decoding and inverse quantizing (1) 340. As explained in detail below, this partially decodes the encoded network audio from peer (1) 310 and generates blocks of MDCT transform coefficients. Similarly, the encoded network audio from each of the peer to peer (N) 315 are processed by performing entropy decoding and inverse quantizing (N) 345. Once again, the ellipsis in FIG. 3 indicates that not all entropy decoding and inverse quantizing is shown. The microphone streams are processed using a modified discrete cosine transform (MDCT) module 350 to also produce MDCT transform coefficients.

The audio mixer is used to mix the audio content from the network audio from peers (1) to (N) and the microphone streams 320. This produces mixed audio packets. This mixed audio content is redelivered as mixed audio to peer (1) 360, as mixed audio to peer (N), and as mixed audio for the other peers, as shown by the ellipsis.

The delivered network audio from peer(1) to peer(N) are also mixed for local playback. The mixed audio, minus the local microphone input content (if local input has been mixed by other peers), then are fed into an inverse MDCT module 370. This recovers the audio content of the network peers and allows playback through the speaker 380.

It should be noted that the audio from other peers is encoded prior to being transmitted over the P2P network. In addition, once the mixed audio content is received by a peer node, that peer decodes the mixed audio to recover the audio associated with the audio communication session. Thus, each of the peer nodes contain an audio mixer 330. In addition, the audio mixer 330 further contains multiple audio encoder and audio decoder components. How and when each of these components is used depends on the processing being done by the peer at any given time. For example, when the local peer is performing mixing and redelivery, the audio mixer 330 receives one frame of coded audio from each peer in the Mutualcast clique, performs a partial decoding, mixes the audio, performs a partial encoding and sends one frame of mixed audio to each network peer. When the local peer becomes a client peer and the mixing and redelivery are assigned to another peer, the audio mixer 330 simply sends one frame of an encoded microphone stream input to the peer in charge of mixing, receives one frame from the mixing peer, performs a decoding operation, and plays back the mixed audio locally. Switching between components as needed occurs quickly, because the round robin scheme used by the P2P audio communication system and method changes the functionality of the local peer node quickly in a round robin manner. The details of the audio mixer 330, audio encoder, and audio decoder are described below.

III. Operational Overview

Figure 4:
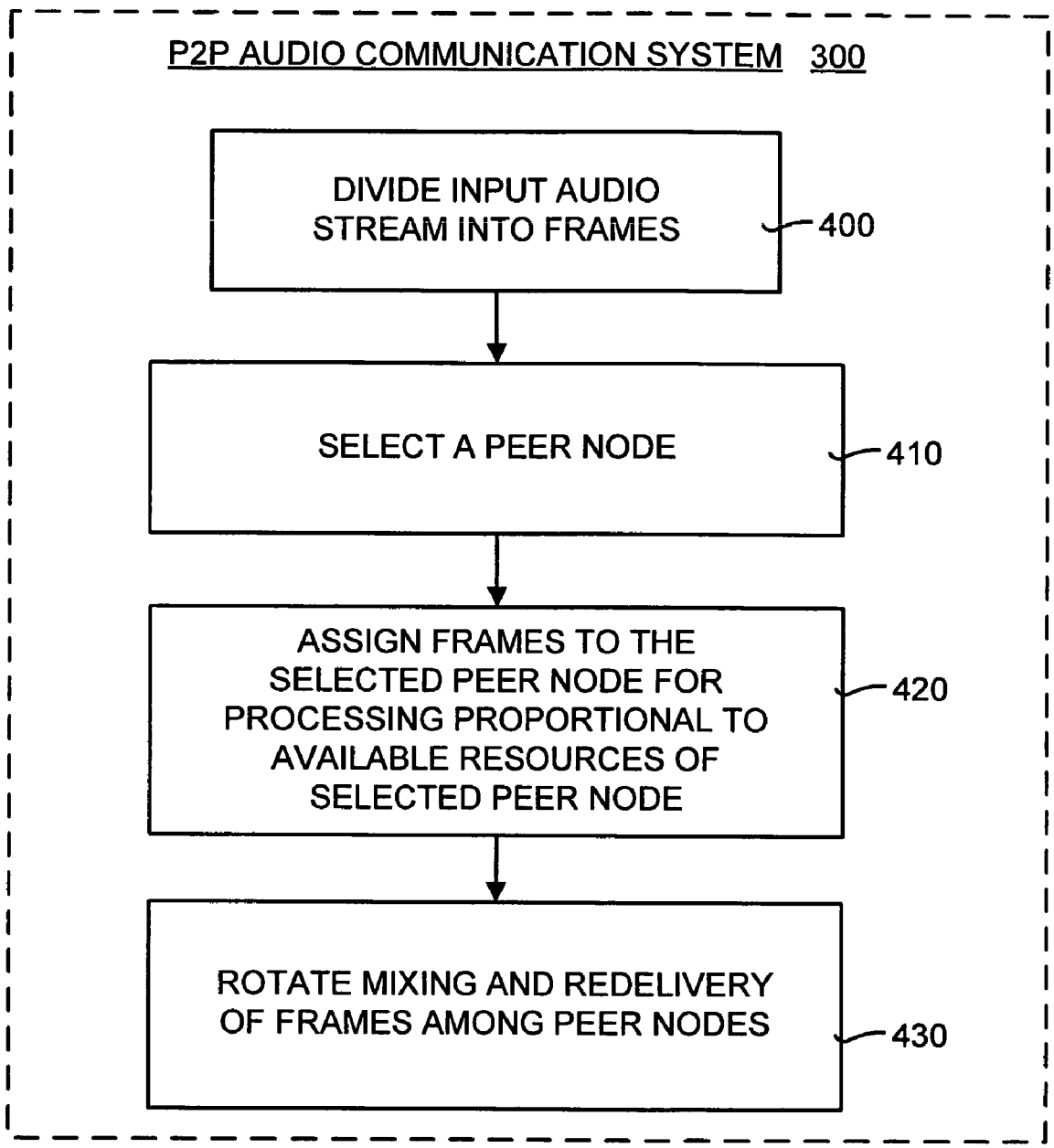
FIG. 4 is a general flow diagram illustrating the general operation of the P2P audio communication system shown in FIG. 3.

The operation of the P2P audio communication system 300 shown in FIG. 3 now will be discussed. FIG. 4 is a general flow diagram illustrating the general operation of the P2P audio communication system 300 shown in FIG. 3. In general, the P2P audio communication method divides an input audio stream into frames or packets and rotates the processing of the frames among the peer nodes in the P2P network. More specifically, the method begins by dividing an input audio stream into a plurality of frames (box 400). Next, one of the peer nodes in the P2P network is selected (box 410).

The selected peer node is assigned to process frames proportional to the available resources of the selected node (box 420). In other words, a peer node having a large amount of resources is assigned a greater number of frames, while a peer node having a fewer amount of resources is assigned a fewer number of frames. Each peer node takes a turn processing the frames. Processing includes the mixing of audio content in the input audio stream and redelivery of the audio to the peer nodes. Thus, the selected peer node performs mixing of audio frames and redelivers the mixed audio frames to other peer nodes in the P2P network. The processing of the frames is rotated among the peer nodes (box 430). In a preferred embodiment, this rotation is performed in a round robin manner or fashion, such that each peer node takes a turn.

IV. Operational Details and Working Example

The details of the operation of the P2P audio communication system and method shown in FIGS. 3 and 4 now will be discussed. In order to more fully understand the P2P audio communication system and method disclosed herein, the operational details of an exemplary working example are presented. It should be noted that this working example is only one way in which the P2P audio communication system and method may be implemented.

Audio Content

Mixing of Waveform Coded Audio

Figure 5:
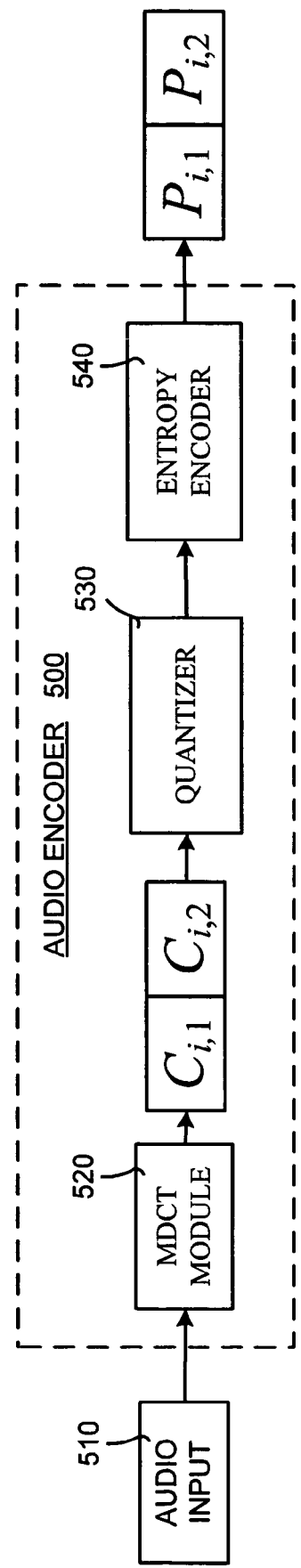
FIG. 5 is a detailed block/flow diagram of the operation of the audio encoder used in this working example.

In this working example, the audio of the P2P audio communication system and method was encoded with a waveform codec. Such a waveform codec is Siren/G.722.1, described in G.722.1, "Coding at 24 and 32 kbit/s for hands-free operation in systems with low frame loss." An alternative codec is MP3, described in Scot Hacker press, "MP3: The definitive Guide". A further alternative codec is Windows Media Audio, in Microsoft Press, "Inside Windows Media". FIG. 5 is a detailed block/flow diagram of the operation of the audio encoder 500 used in this working example.

Referring to FIG. 5, the audio input 510 containing audio waveforms first was split or divided into frames. In this working example, each frame was approximately 20 millisecond (ms) long. It should be noted that because there was a 50 % overlap in between frames, the total algorithmic delay is 40 ms, which doubles that of the frame. Nevertheless, each quantized and entropy coded frame coefficients was still 20 ms long. Next, each frame was transformed by a modified discrete cosine transform (MDCT) module 520 into coefficient blocks ($C_{i,j}$). The subscript i indicates the peer and the subscript j indicates the frame number. Thus, in FIG. 5, the coefficient block $C_{i,1}$ indicates the first frame for the $i^{th}$ peer and the coefficient block $C_{i,2}$ indicates the second frame for the $i^{th}$ peer. Next, the coefficient blocks were sent to a quantizer 530 and quantized. The quantized coefficient blocks then were entropy encoded by the entropy encoder 540 into packets $p_{i,j}$. In FIG. 5, the encoded packets $P_{i,1}$ and $P_{i,2}$ indicate encoded packets for the first and second frames of the $i^{th}$ peer.

Figure 6:
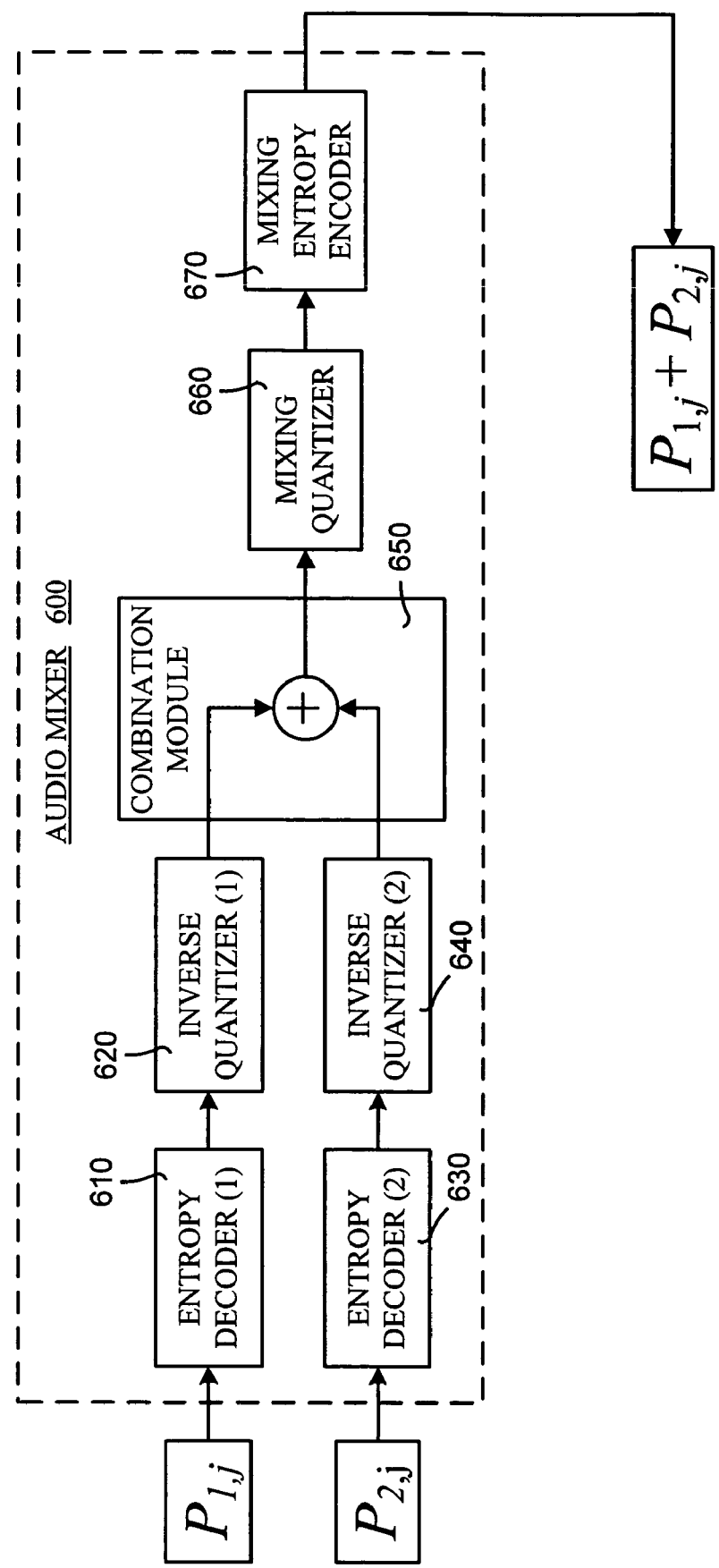
FIG. 6 is a detailed block/flow diagram of the operation of the audio mixer used in this working example and shown in FIG. 3.

Since the MDCT is a linear operation, the waveform-coded audio can not only be mixed in the transform domain, but also be mixed on a frame-by-frame basis. FIG. 6 is a detailed block/flow diagram of the operation of the audio mixer 600 used in this working example. In FIG. 6, the mixing of a certain frame of two compressed audio packets is shown. In general, the audio mixer 600 decodes the compressed audio packets of a certain frame to obtain coefficients blocks, combines the coefficient blocks, and re-encodes the blocks to obtain a single compressed audio packet for a frame of audio. Rather performing the mixing operation on an entire input audio stream, as in done in current audio conferencing systems, the audio mixing technique of the P2P audio communication system and method mixes frames of the audio.

In particular, in this working example the compressed audio packet $P_{1,j}$ was decoded using an entropy decoder (1) 610 and an inverse quantizer (1) 620 to obtain a coefficient block for a certain peer. Similarly, the compressed audio packet $P_{2,j}$ was decoded using an entropy decoder (2) 630 and an inverse quantizer (2) 640 to obtain a coefficient block for a another peer. The resultant coefficients were MDCT transform coefficients. These MDCT transform coefficients then were added together or combined using the combination module 650, as shown by the "+" sign in the combination module 650. It should be noted that although a "+" sign is shown in FIG. 6, for audio, combination may be subtraction (a minus sign "−") or addition (a plus sign "+") and there will be no audible difference for the coded audio. Next, the resultant coefficient block was quantized using a mixing quantizer 660 and then entropy re-encoded using a mixing entropy encoder 670. This generated a frame containing the mixed audio packet, $P_{1,j}+P_{2,j}$. No audio packets of any other frames were accessed during the mixing process.

Figure 7:
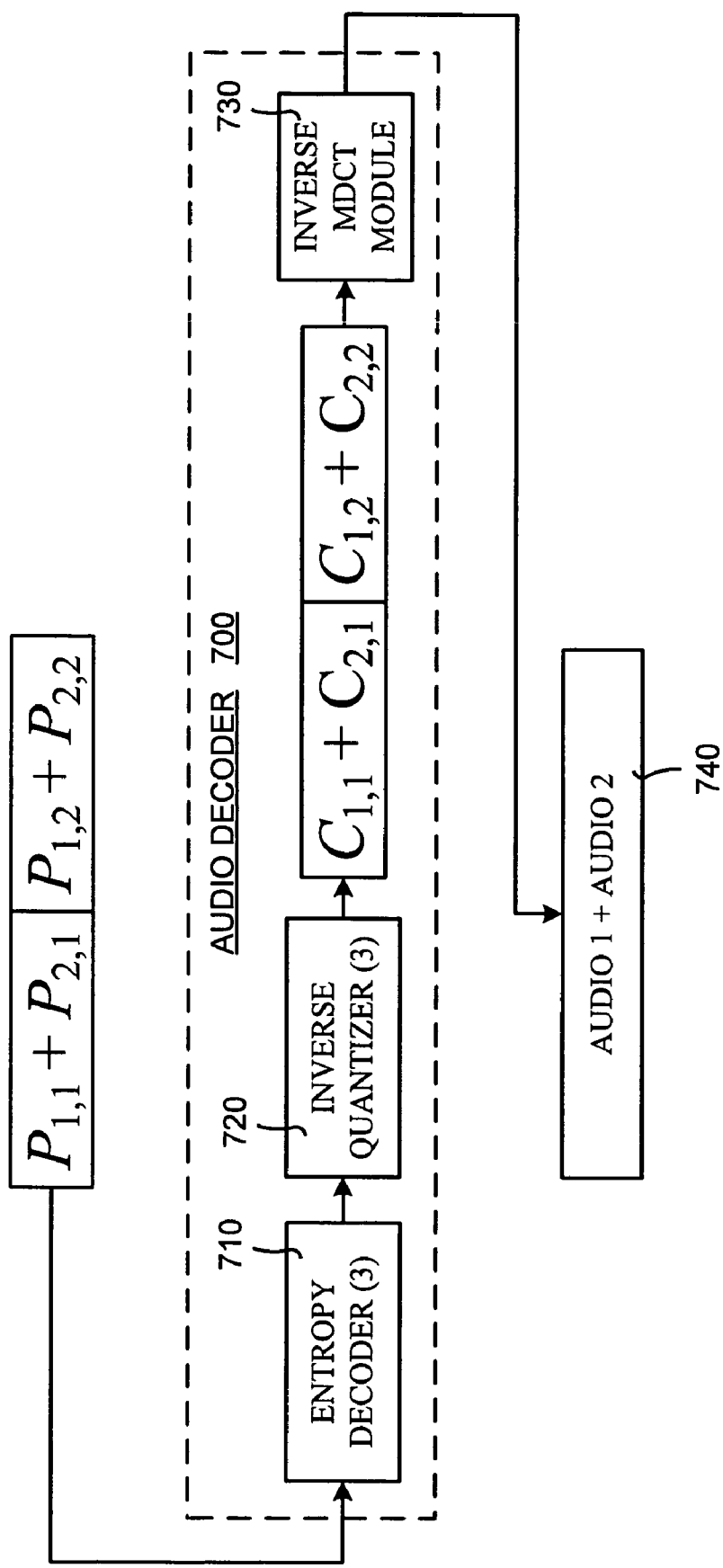
FIG. 7 is a detailed block/flow diagram of the operation of the audio decoder used in this working example.

FIG. 7 is a detailed block/flow diagram of the operation of the audio decoder 700 used in this working example. At a receiver, the mixed packets were decoded normally. Referring to FIG. 7, the mixed audio packet $P_{1,j}+P_{2,j}$ was input to the audio decoder 700. Each frame was processed by the entropy decoder (3) 710 and then by the inverse quantizer (3) 720. This produced mixed MDCT transform coefficients, $C_{1,1}+C_{2,1}$ and $C_{1,2}+C_{2,2}$. Next, the mixed MDCT transform coefficients were processed using the inverse MDCT module 730. The resultant output was the mixed audio waveform from peer 1 and 2 (audio 1+audio 2) 740.

Round-Robin Rotational Mixing and Redelivery of Audio Content

Another component in this working example was the rotational mixing and redelivery of the audio content in a round robin manner. In other words, each of the peers take a turn in mixing and redelivering the audio content. In this working example, a MutualCast clique was used that consisted of a small number of peer nodes that formed a fully connected mesh. Using the property that the waveform-coded audio content can be mixed on a frame-by-frame basis, the P2P audio conferencing system and method rotated the mixing and redelivery operation among the peers. This ensured that the bandwidth and computation load were appropriately distributed in the most efficient manner. In a preferred embodiment, the rotation was performed in a round robin manner or fashion such that each peer node took a turn mixing and redelivering the audio.

Figure 8:
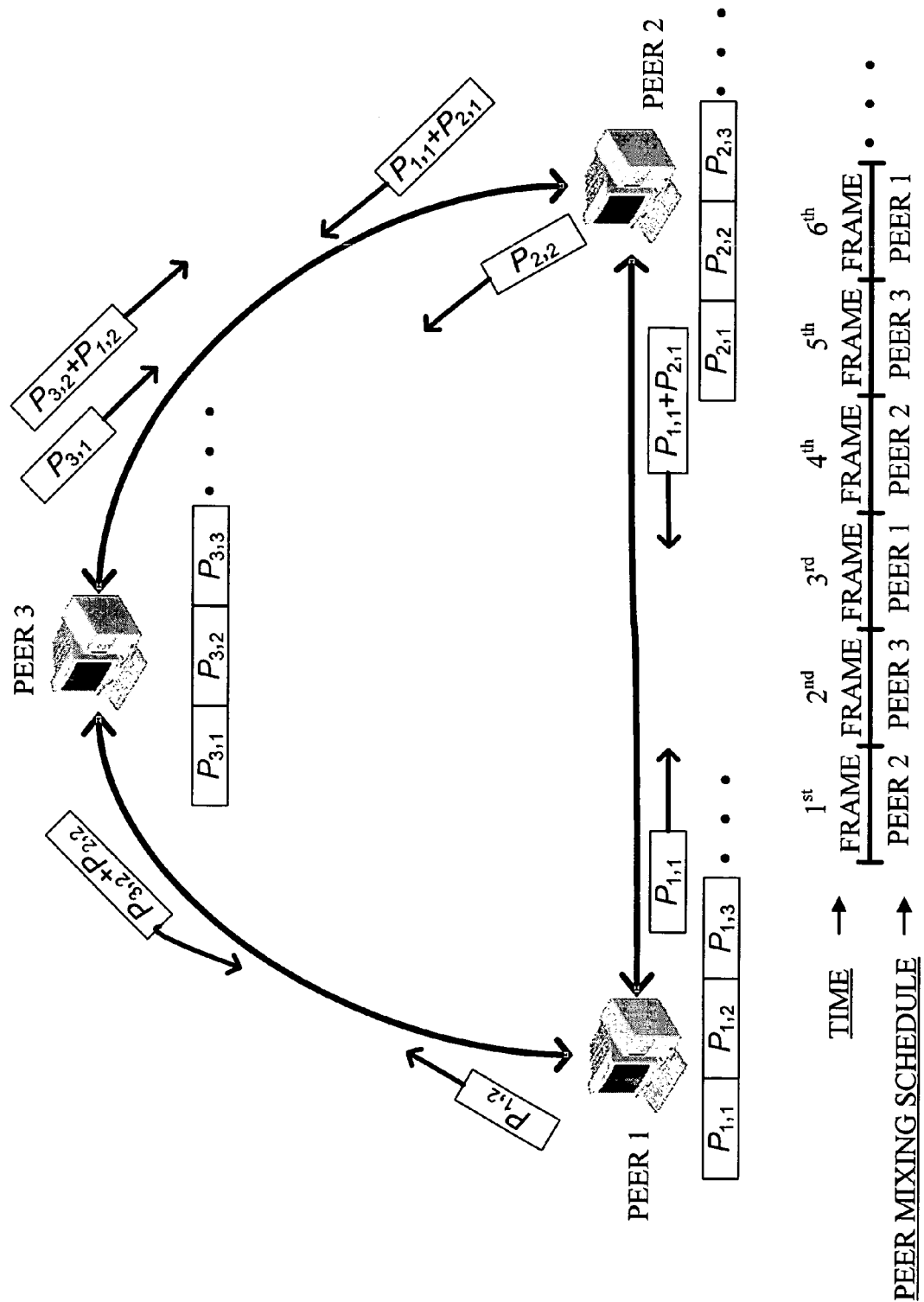
FIG. 8 illustrates the operation of the audio mixer shown in FIG. 6 for three peer nodes (1, 2 and 3) used in this working example.

FIG. 8 illustrates an audio mixing session for three peer nodes (1, 2 and 3) used in this working example. An audio mixing schedule is shown at the bottom of FIG. 8. Referring to the audio mixing schedule, the peer nodes 1, 2 and 3 were in charge of audio mixing and redelivery at frames 3k, 3k+1 and 3k+2, respectively. Thus, at the $1^{st}$ frame, peer 2 mixed and redelivered the audio packets. While peer 2 was in charge of mixing and redelivery, peers 1 and 3 sent their coded audio $P_{1,1}$ and $P_{3,1}$ to peer 2, as shown in FIG. 8. The incoming audio packets then were entropy decoded and inverse quantized back to the MDCT coefficients $C_{1,1}$ and $C_{3,1}$. Peer 2 then added its own coefficients $C_{2,1}$. The mixed audio then was sent back to peers 1 and 3.

In order to avoid echo, the source audio was not mixed and sent back. In other words, referring to FIG. 8, peer 2 added together coefficients $C_{1,1}$ and $C_{2,1}$, quantized and entropy encoded the sum of the coefficients. Peer 2 then sent the mixed packet $P_{1,1}+P_{2,1}$ back to peer 3. Similarly, the mixed packet $P_{3,1}+P_{2,1}$ was sent by peer 2 to peer 1. At the destination, the mixed audio packets from the different peers were sorted, entropy decoded, inverse quantized and inverse MDCT transformed for play back.

Referring again to the mixing schedule of FIG. 8, at the $2^{nd}$ frame, peer 3 assumed the mixing role. Peers 1 and 2 sent their compressed audio packets at the $2^{nd}$ frame $P_{1,2}$ and $P_{2,2}$ to peer 3. Peer 3 then mixed the incoming audio packets with its own coefficients $C_{3,2}$. Next, peer 3 sent the mixed packet $P_{3,2}+P_{2,2}$ to peer 1 and the mixed packet $P_{3,2}+P_{1,2}$ to peer 2.

At the $3^{rd}$ frame, peer node 1 became the mixing node, and so forth, as shown in FIG. 8. By time sharing the mixing and redelivery tasks, the bandwidth and computational cost of the mixing is distributed among each of the peers. As a result, a group of less powerful peers can conduct a multi-party audio communication session without need for a server.

In the P2P audio communication system and method, a MutualCast clique consists of n nodes. Each peer node sends and receives 2(n−1) packets every n frames. Among them, (n−1) packets are sent and received during the n−1 frames that it does not perform the mixing operation. Moreover, (n−1) packets are sent and received during the frame that it performs the mixing and redelivery operation. The upload/download bandwidth required is thus (2−2/n)·bw. It may also be calculated that on average, (2−2/n) streams of audio are decoded and re-encoded by each peer. During the mixing, the peer performs (n−1) entropy decoding and inverse quantization operations, and (n−1) forward quantization and entropy encoding operations.

There are at least two possibilities as to the audio content contained in the redelivered mixed audio packets. In a preferred embodiment, the mixed audio packet does not contain the source (or selected) peer nodes' audio content. In other words, the rotational audio mixing technique includes not mixing and not sending back a certain peer's source audio. In an alternate embodiment, the mixed audio packet contains audio content from each of the peer nodes and it is up to each peer node to subtract out its own audio content from the mixed audio packet. For example, the mixed audio includes packets $(m_j = p_{1,j} + p_{2,j} + p_{3,j})$ for frame j. Then, the same mixed audio is sent back to all peers. In order to reduce or eliminate echo, each peer is responsible for subtracting its own audio from the mixed audio. For example, peer i would subtract $p_{i,j}$ from $m_j$, which is a mixing operation with subtraction instead of addition. The advantage of this alternate embodiment is that the peer only needs to perform a single forward quantization and entropy encoding operation during the mixing. Moreover, if IP multicast is supported among all the peers, the mixing peer may also multicast the mixed packet to the rest of the peers. The disadvantage of the alternate embodiment is that since the mixed audio needs to be quantized and entropy coded, the component audio $p_{i,j}$ in the mixed packet $m_j$ is different from the audio $p_{i,j}$ hold by the peer i. Thus, residual echo may persist. This residual echo is more obvious with the increase of the number of the peers and/or the decrease in the coding bitrate of the mixed audio. Thus, due to this residual echo problem, the preferred embodiment is to not mix all of the audio packets.

Allocation of Mixing Tasks

The P2P audio communication system and method allocates the mixing and redelivery tasks of the audio on a frame-by-frame basis. In this manner, the P2P audio communication system and method assigns more mixing tasks to peers having greater resources, and fewer mixing tasks to peers having fewer resources. The paramount resource considered by the P2P audio communication system and method is the upload bandwidths of the peers. In increasingly common networks, the total upload bandwidths of the P2P network are much smaller than the total download bandwidths. This is especially true for end-user nodes on the cable modem and ADSL networks, for which the balance is asymmetrically skewed towards larger download bandwidth. Even for the user nodes on the university/corporate networks, the download bandwidth can still be larger than the available upload bandwidth as the user caps the upload bandwidth. Therefore, it is advantageous to allocate more mixing and redelivery tasks to the peer with higher available upload bandwidth, and fewer tasks to the peer with lower upload bandwidth.

A second resource considered by the P2P audio communication system and method is the peak upload bandwidth (or the physical link bandwidth) of the peer. During the mixing, a peer of the P2P audio communication system and method receives and sends out (n−1) audio packets to (n−1) peers. The traffic characteristics of a peer in the P2P audio communication system is bursty. It is helpful to assign more mixing and redelivery tasks to the peer with a faster physical link, or the peer that is connected to the router with a relatively large token bucket, so that the delay caused by sending packets to multiple peers can be reduced.

Normally, the download bandwidths and the computation resources of the peers are not a bottleneck. Nevertheless, the P2P audio communication system and method may also take these into consideration in the allocation as well. It should be noted that if the slower or less powerful nodes are allowed to deliver fewer packets, they become leeches of the faster, more powerful peers. Whether to allow such leech behavior is a design choice between better audio communication performance verses fairness on contribution.

Delay

The maximum delay of the P2P audio communication system and method now will be calculated and presented. Let the network transmission delay between peer nodes i and j be $d_{i,j}$. Assuming that the delay caused by the mixing operation is negligible, the delay of peer i to receive an audio frame mixed by peer k amounts to:

$$D_{i,k} = \left(\max_{j \neq i,k} d_{j,k}\right) + d_{k,i}. \quad (1)$$

The maximum delay of peer i can be calculated as:

$$D_i = \max_{k \neq i}\left(d_{k,i} + \left(\max_{j \neq i,k} d_{j,k}\right)\right), \quad (2)$$

while the maximum delay of the P2P audio communication system and method is:

$$D_{\max} = 2\max_{i \neq j} d_{i,j}, \quad (3)$$

which is two times the network delay of the farthest peer pair in a MutualCast clique.

V. Super Gateways and Super Servers

A MutualCast clique of the P2P audio communication system must be formed by a set of fully connected peer nodes. As shown above, the delay increases as the clique grows large. Accordingly, the number of nodes in a MutualCast clique ideally should not be very large. A reasonable number is between 3 to 7. Nevertheless, the MutualCast clique can serve as a super gateway or super server, and thus function in a much larger network, while retaining all the functionality of the P2P audio communication system and method described herein.

Super Gateway Node

Figure 9:
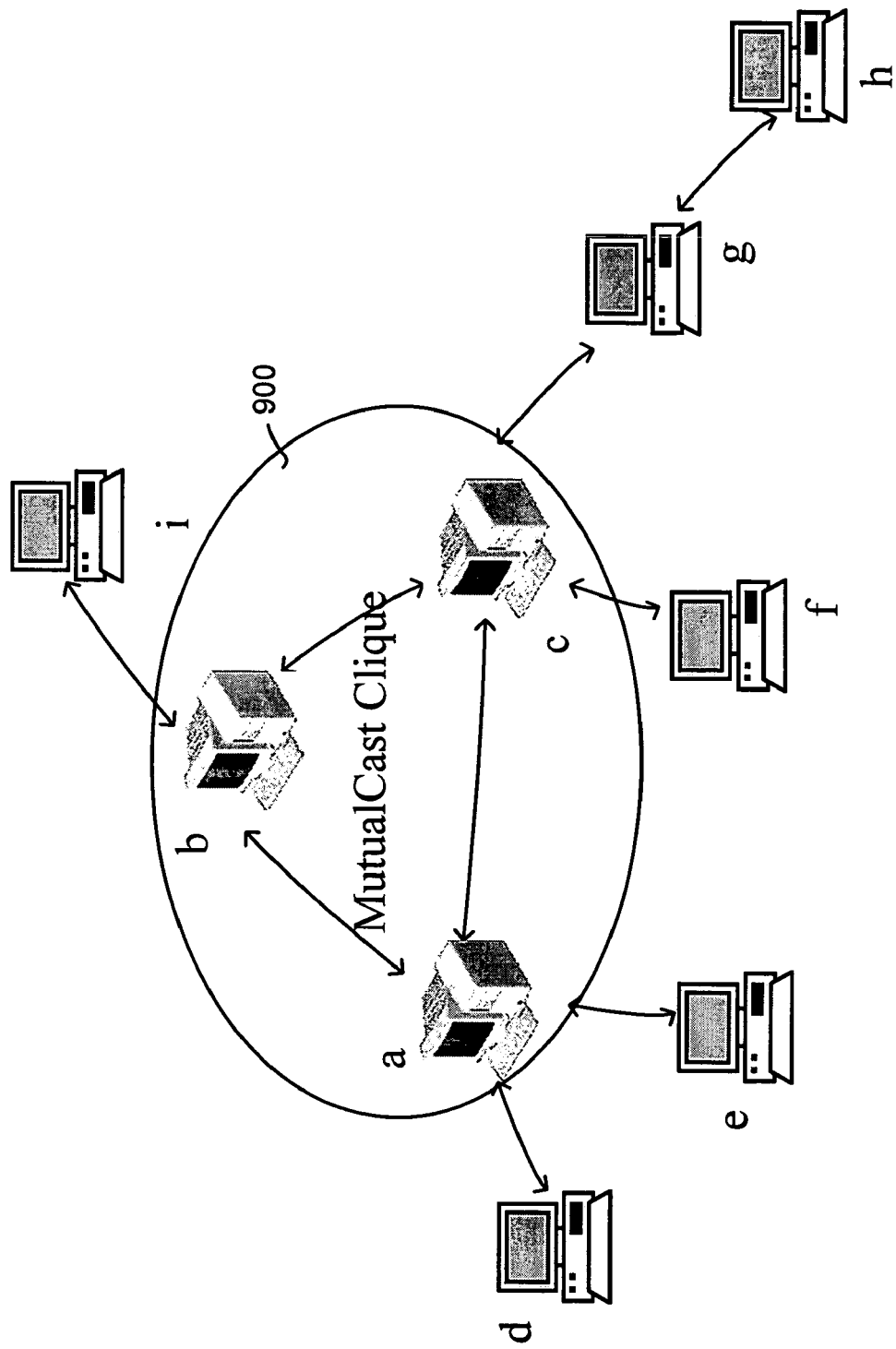
FIG. 9 illustrates an exemplary example of a MutualCast clique of the P2P audio communication system and method serving as a gateway node in a generic multi-party conference graph.

The P2P audio communication system can function as a super gateway node. This allows the MutualCast clique to serve as a "super" gateway node in a large multi-party communication session. In this situation, the rest of the nodes form a generic graph and use end system mixing. FIG. 9 illustrates an exemplary example of a MutualCast clique of the P2P audio communication system and method serving as a gateway node in a generic multi-party communication session. This configuration is particularly well-suited for a multi-party communication session having a large number of peer nodes, where a small number of close-by nodes are fully connected and form a MutualCast clique.

As shown in the exemplary example of FIG. 9, the MutualCast clique 900 formed by the nodes a, b and c serves as a "super" gateway node for nodes d, e, f, g and i. Each peer node in the MutualCast clique 900 serves as a gateway for the nodes attached. For example, peer node a is attached to two nodes d and e outside of the MutualCast clique 900. Thus, within the MutualCast clique 900, node a merges the audio of d and e with its own, and delivers the combined audio (a+d+e) to nodes b and c using the P2P audio communication system and method. At frames where the node a is mixing for the MutualCast clique 900, the combined audio (a+d+e) is mixed with the input from the node b (audio b+i) and sent to node c. Likewise, the combined audio (a+d+e) is mixed with the input from node c (audio c+f+g+h) and sent to node b. Node a also mixes the inputs from nodes b and c, combined it with its own, $$m=a+b+i+c+f+g+h. \qquad (4)$$

and sends m+d to node e, and sends m+e to node d.

At frames where node a is not mixing, the combined audio (a+d+e) is sent to the mixing node (b or c) at the moment. Node a also receives the mixed input from nodes b or c, combines them with its own to form the mixed frame m, and sends m+d to node e, and sends m+e to node d.

Super Server

Figure 10:
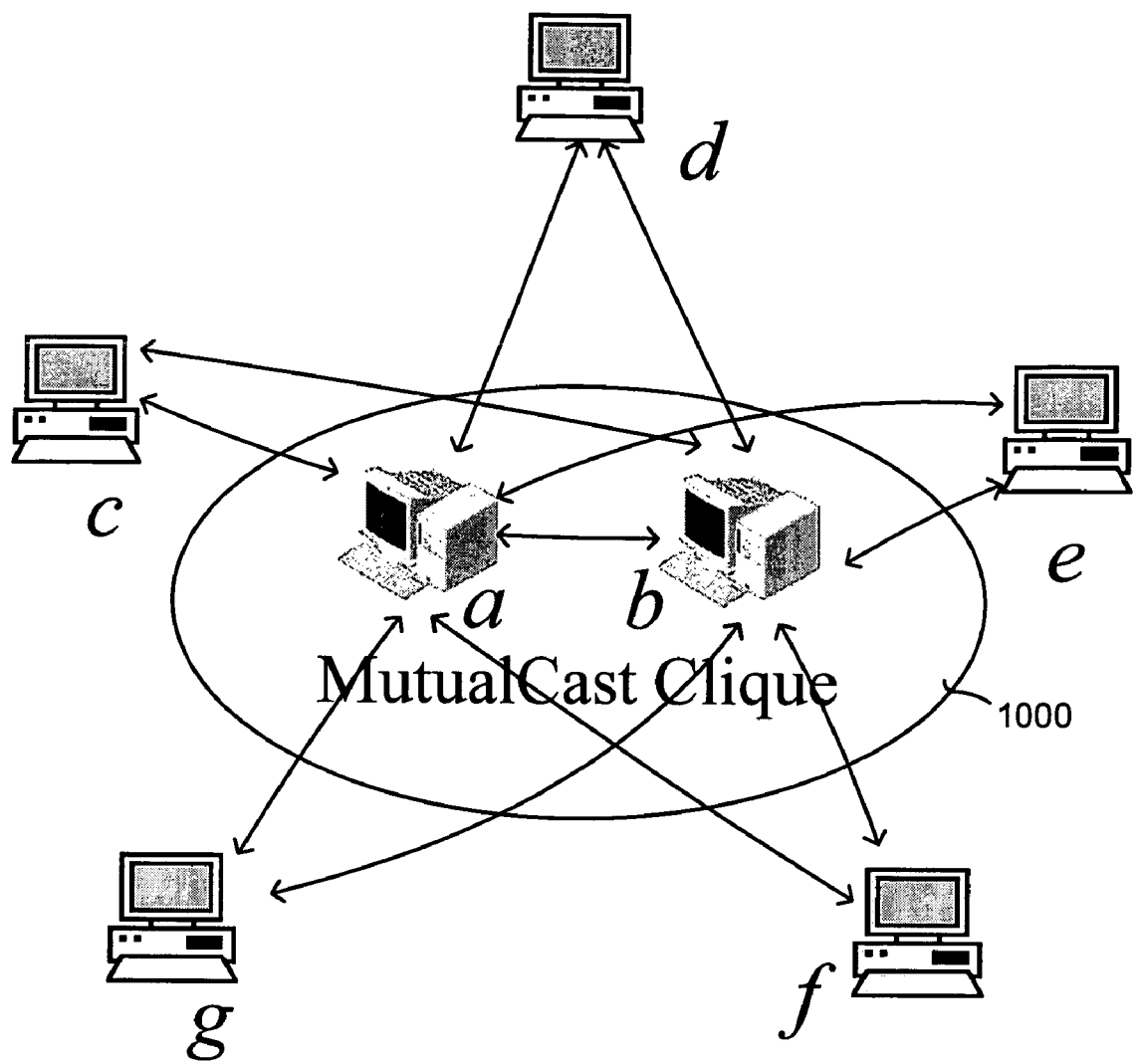
FIG. 10 illustrates an exemplary example of a MutualCast clique of the P2P audio communication system and method as a super server in a multi-party communication session with a star topology.

The P2P audio communication system also can function as a super server. In this situation, the remainder of the nodes are the client nodes in a star topology, and the MutualCast clique may consist as fewer as two nodes. FIG. 10 illustrates an exemplary example of a MutualCast clique as a super server in a multi-party communication session with a star topology.

As shown in FIG. 10, peer nodes a and b form a two-node MutualCast clique 1000, which serves as a super server for the rest client nodes c, d, e, f and g. The peer nodes in the MutualCast clique 1000 again form a fully connected mesh. In addition, each client node outside is connected to all peer nodes in the MutualCast clique 1000. This configuration is more suited for small-to-medium size networks (such as between 4 and 16), where there are a few powerful broadband nodes that share to serve as the server.

Another scenario involved this configuration occurs when there is a network address translator (NAT) or firewall. Specifically, the client nodes may be behind NAT/firewall. They can connect to the nodes that are directly connected to the Internet, in other words, those of the MutualCast clique 1000. However, they can not connect to each other. The mixing and redelivery operation of such network is very similar to the P2P audio communication system and method described above. The only difference is that in this embodiment the client nodes are exempted from the mixing and redelivery tasks. At each frame, one peer of the MutualCast clique 1000 mixes and redelivers the audio packets for the rest of the peers, both inside and outside the MutualCast clique 1000.

VI. Bandwidth and Computation Load Analysis

In this section, the bandwidth requirement of different audio communication session scenarios using the P2P audio communication system and method is calculated and compared to those scenarios not using the P2P audio communication system and method. First, consider an n-party communication session. If all peers are of equal bandwidth, the P2P audio communication system and method requires the upload/download bandwidth of (2−2/n)·bw for each and every peer node. In particular, for a three-node MutualCast clique, the bandwidth required is 1.34 bw. The same three-node communication session needs a node with bandwidth at least 2 bw to conduct a multi-party communication session with either star topology, or generic graph. Thus, the P2P audio communication system and method can conduct multi-party communication sessions even when all peer nodes are less resourceful.

Second, consider the case when the MutualCast clique serves as a super gateway in a large graph. Let the gateway node be connected to m nodes. Normally, the gateway node needs m·bw upload and download bandwidth to mix and redeliver the audio traffic. By replacing the gateway node with an n-node MutualCast clique, and assuming m/n nodes are attached to each node, the upload/download bandwidth requirement of each node is reduced in this super gateway to:

$$\left(2 + \frac{m-2}{n}\right)bw. \qquad (5)$$

By way of example, let m=6 and n=3. In this case, the P2P audio communication system and method reduces the bandwidth requirement from 6 bw to 3.34 bw. The use of the MutualCast clique as a super gateway also may reduce the bandwidth requirement of the gateway nodes.

Finally, consider the case when the MutualCast clique is used as a super server. Assume again that there are m clients. Without using the P2P audio communication system and method, the server needs m·bw upload and download bandwidth to serve the m clients. However, when using the P2P audio communication system and method and a MutualCast clique of n nodes, it can be calculated again that on average, each peer node in the MutualCast clique needs only $$\left(2 + \frac{m-2}{n}\right)bw$$

upload/download bandwidth. As an example, let m=5 and n=2. The P2P audio communication system and method reduces the bandwidth requirement of the server node from 5 bw to 3.5 bw. It can be easily deduced that MutualCast reduces the computation load of the peer, the super gateway node and the super server node by the same proportion as well.

VII. Exemplary Operating Environment

The P2P audio communication system and method are designed to operate in a computing environment and on a computing device. The computing environment in which the P2P audio communication system and method operates will now be discussed. The following discussion is intended to provide a brief, general description of a suitable computing environment in which the P2P audio communication system and method may be implemented.

FIG. 12 illustrates an example of a suitable computing system environment in which the P2P audio communication system and method shown in FIGS. 3 and 4 may be implemented. The computing system environment 1100 is only one example of a suitable computing environment and is not intended to suggest any limitation as to the scope of use or functionality of the invention. Neither should the computing environment 1100 be interpreted as having any dependency or requirement relating to any one or combination of components illustrated in the exemplary operating environment 1100.

The P2P audio communication system and method is operational with numerous other general purpose or special purpose computing system environments or configurations. Examples of well known computing systems, environments, and/or configurations that may be suitable for use with the P2P audio communication system and method include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

Figure 11:
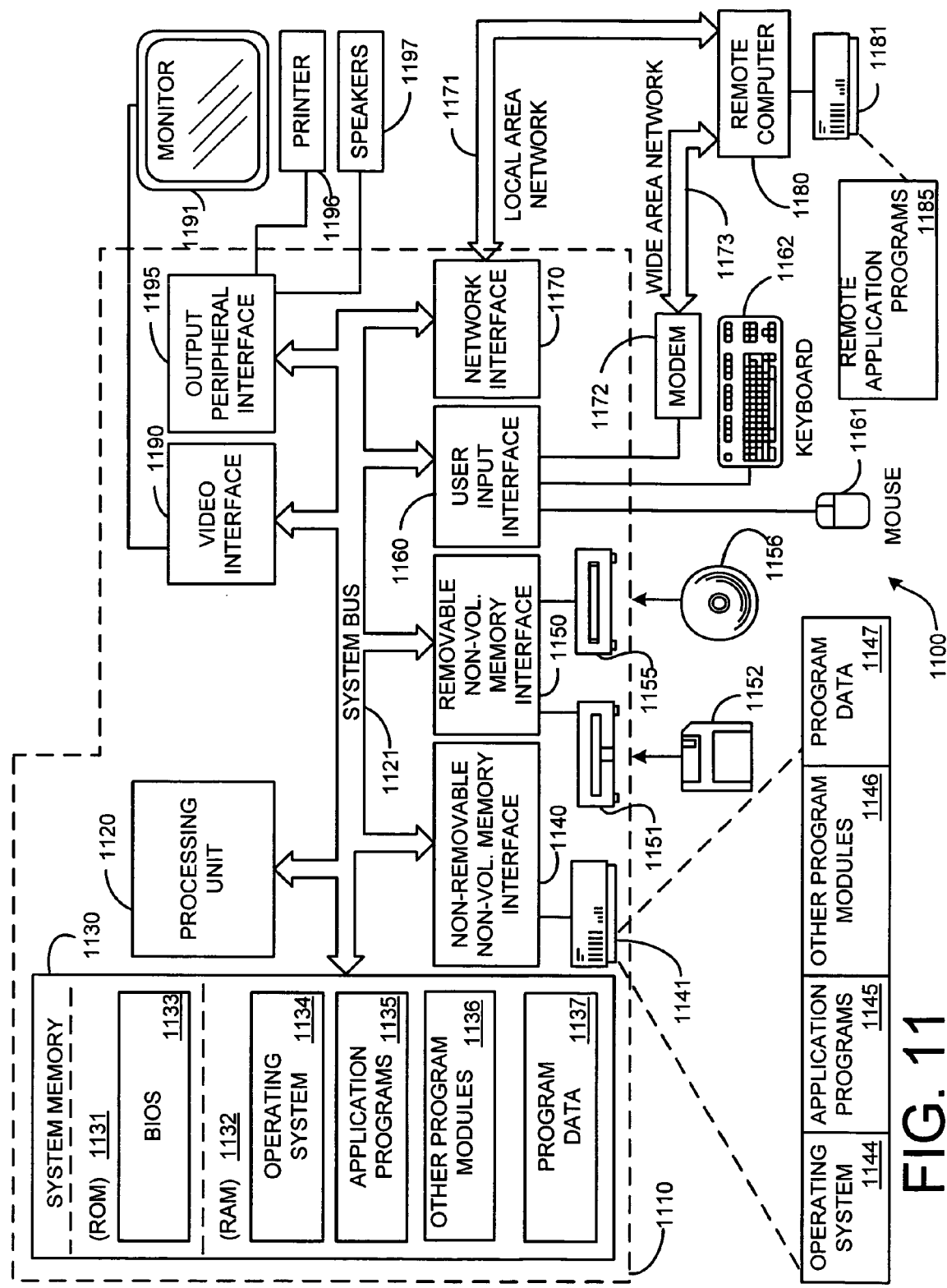
FIG. 11 illustrates an example of a suitable computing system environment in which the P2P audio communication system and method shown in FIGS. 3 and 4 may be implemented.

The P2P audio communication system and method may be described in the general context of computer-executable instructions, such as program modules, being executed by a computer. Generally, program modules include routines, programs, objects, components, data structures, etc., that perform particular tasks or implement particular abstract data types. The P2P audio communication system and method may also be practiced in distributed computing environments where tasks are performed by remote processing devices that are linked through a communications network. In a distributed computing environment, program modules may be located in both local and remote computer storage media including memory storage devices. With reference to FIG. 11, an exemplary system for implementing the P2P audio communication system and method includes a general-purpose computing device in the form of a computer 1110. The peer nodes shown in FIG. 11 are examples of the computer 1110.

Components of the computer 1110 may include, but are not limited to, a processing unit 1120, a system memory 1130, and a system bus 1121 that couples various system components including the system memory to the processing unit 1120. The system bus 1121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 1110 typically includes a variety of computer readable media. Computer readable media can be any available media that can be accessed by the computer 1110 and includes both volatile and nonvolatile media, removable and non-removable media. By way of example, and not limitation, computer readable media may comprise computer storage media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 1110.

The system memory 1130 includes computer storage media in the form of volatile and/or nonvolatile memory such as read only memory (ROM) 1131 and random access memory (RAM) 1132. A basic input/output system 1133 (BIOS), containing the basic routines that help to transfer information between elements within the computer 1110, such as during start-up, is typically stored in ROM 1131. RAM 1132 typically contains data and/or program modules that are immediately accessible to and/or presently being operated on by processing unit 1120. By way of example, and not limitation, FIG. 11 illustrates operating system 1134, application programs 1135, other program modules 1136, and program data 1137.

The computer 1110 may also include other removable/non-removable, volatile/nonvolatile computer storage media. By way of example only, FIG. 11 illustrates a hard disk drive 1141 that reads from or writes to non-removable, nonvolatile magnetic media, a magnetic disk drive 1151 that reads from or writes to a removable, nonvolatile magnetic disk 1152, and an optical disk drive 1155 that reads from or writes to a removable, nonvolatile optical disk 1156 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1141 is typically connected to the system bus 1121 through a non-removable memory interface such as interface 1140, and magnetic disk drive 1151 and optical disk drive 1155 are typically connected to the system bus 1121 by a removable memory interface, such as interface 1150.

The drives and their associated computer storage media discussed above and illustrated in FIG. 11, provide storage of computer readable instructions, data structures, program modules and other data for the computer 1110. In FIG. 11, for example, hard disk drive 1141 is illustrated as storing operating system 1144, application programs 1145, other program modules 1146, and program data 1147. Note that these components can either be the same as or different from operating system 1134, application programs 1135, other program modules 1136, and program data 1137. Operating system 1144, application programs 1145, other program modules 1146, and program data 1147 are given different numbers here to illustrate that, at a minimum, they are different copies. A user may enter commands and information into the computer 1110 through input devices such as a keyboard 1162 and pointing device 1161, commonly referred to as a mouse, trackball or touch pad.

Other input devices (not shown) may include a microphone, joystick, game pad, satellite dish, scanner, radio receiver, or a television or broadcast video receiver, or the like. These and other input devices are often connected to the processing unit 1120 through a user input interface 1160 that is coupled to the system bus 1121, but may be connected by other interface and bus structures, such as, for example, a parallel port, game port or a universal serial bus (USB). A monitor 1191 or other type of display device is also connected to the system bus 1121 via an interface, such as a video interface 1190. In addition to the monitor, computers may also include other peripheral output devices such as speakers 1197 and printer 1196, which may be connected through an output peripheral interface 1195.

The computer 1110 may operate in a networked environment using logical connections to one or more remote computers, such as a remote computer 1180. The remote computer 1180 may be a personal computer, a server, a router, a network PC, a peer device or other common network node, and typically includes many or all of the elements described above relative to the computer 1110, although only a memory storage device 1181 has been illustrated in FIG. 11. The logical connections depicted in FIG. 11 include a local area network (LAN) 1171 and a wide area network (WAN) 1173, but may also include other networks. Such networking environments are commonplace in offices, enterprise-wide computer networks, intranets and the Internet.

When used in a LAN networking environment, the computer 1110 is connected to the LAN 1171 through a network interface or adapter 1170. When used in a WAN networking environment, the computer 1110 typically includes a modem 1172 or other means for establishing communications over the WAN 1173, such as the Internet. The modem 1172, which may be internal or external, may be connected to the system bus 1121 via the user input interface 1160, or other appropriate mechanism. In a networked environment, program modules depicted relative to the computer 1110, or portions thereof, may be stored in the remote memory storage device. By way of example, and not limitation, FIG. 11 illustrates remote application programs 1185 as residing on memory device 1181. It will be appreciated that the network connections shown are exemplary and other means of establishing a communications link between the computers may be used.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description of the invention, but rather by the claims appended hereto.

What is claimed is:

1. A method for a multi-party, real-time communication session using peer nodes in a peer-to-peer computer network, comprising:
   dividing an input stream into a plurality of frames;
   assigning each frame to the peer nodes such that a peer node receives a number of frames proportional to the available resources of the peer node; and
   rotating mixing and redelivery of the plurality of frames on a frame-by-frame basis among at least some of the peer nodes to provide the multi-party real-time communication session.

2. The method as set forth in claim 1, wherein rotating mixing and redelivery of the plurality of frames further comprises mixing and redelivering at least part of the input stream in a round robin manner.

3. The method as set forth in claim 2, wherein the input stream is at least one of: (a) an arriving audio stream containing audio content; (b) an arriving microphone signal containing audio content, and further comprising mixing and redelivering the audio content.

4. The method as set forth in claim 3, wherein mixing further comprises:
   performing one of the following processes to generate encoded audio coefficient rackets: (a) entropy decoding and inverse quantizing of the arriving audio stream to generate encoded audio coefficient packets; (b) transforming of the arriving microphone signal into audio coefficient blocks and encoding the audio coefficient blocks to generate encoded audio coefficient packets; and
   combining the audio coefficient packets and blocks to generate a resultant coefficient block that is a combination of the coefficient packets and blocks for a certain frame.

5. The method as set forth in claim 4, further comprising:
   quantizing the resultant coefficient block; and
   re-encoding the quantized resultant coefficient block to generate a mixed audio packet.

6. The method as set forth in claim 5, further comprising:
   decoding the mixed audio packet; and
   inverse quantizing the decoded mixed audio packet to obtain mixed transform coefficients; and
   applying an inverse transform to the mixed transform coefficients to generate an audio stream containing mixed audio content.

7. The method as set forth in claim 3, further comprising mixing and redelivering audio content from each of the peer nodes except from a certain peer node to which the audio stream and microphone signal is sent.

8. The method as set forth in claim 3, further comprising:
   mixing and redelivering at least one of the following: (a) the arriving audio stream containing audio content; (b) the arriving microphone signal containing audio content; and
   causing each peer node to subtract its own audio content from a mixed audio content to reduce echo.

9. The method as set forth in claim 1, further comprising:
   defining a clique as the peer nodes that form a fully connected mesh; and
   arranging the clique such that it serves as a super gateway node in the multi-party, real-time communication session.

10. The method as set forth in claim 1, further comprising:
    defining a clique as the peer nodes that form a fully connected mesh; and
    arranging the clique such that it serves as a super server in a star topology having additional nodes that act as client nodes in the multi-party, real-time communication session such that client nodes are exempted from the mixing task.

11. A computer-readable medium having computer-executable instructions for performing the computer-implemented method recited in claim 1.

12. A computer-implemented process for conducting a multi-party real-time audio communication session between peer nodes in a peer-to-peer computer network, each of the peer nodes having an audio stream, comprising:
    a packet splitting step for splitting the audio stream from each of the peer nodes into audio packets;
    an audio mixing step for combining audio packets from a certain time from each of the peer nodes to generate a mixed audio packet at that time; and
    a rotation step for rotating audio mixing of mixed audio packets and redelivery of the mixed audio packets on a packet-by-packet basis among each of the peer nodes, such that at least some of the peer nodes have a turn performing audio mixing and redelivery.

13. The computer-implemented process as set forth in claim 12, further comprising rotating the audio mixing and redelivery between at least some of the peer nodes in a round robin manner.

14. The computer-implemented process as set forth in claim 13, wherein the audio mixing step further comprises:
    encoding the audio packets using an entropy encoder to generate entropy- encoded audio packets; and
    mixing on a packet-by-packet basis the entropy-encoded audio packets.

15. The computer-implemented process as set forth in claim 14, further comprising:
    selecting entropy-encoded audio packets at the certain time from each of the peer nodes;
    entropy decoding and inverse quantizing the selected audio packets to generate coefficient blocks corresponding to each of the selected audio packets;

combining the coefficient blocks to generate a resultant coefficient block for each of the peer nodes at the certain time; and quantizing and entropy re-encoding the resultant coefficient block to produce the mixed audio packet.

16. The computer-implemented process as set forth in claim 12, further comprising:

entropy decoding and inverse quantizing the mixed audio packets at a receiving peer node to obtain mixed transform coefficients; and inverse modified discrete cosine transforming the mixed transform coefficients to recover audio content.

17. The computer-implemented process as set forth in claim 16, wherein the audio content further comprises audio content from each of the peer nodes except a source peer node that is performing mixing and redelivery.

18. The computer-implemented process as set forth in claim 16, wherein the audio content includes audio content from each of the peer nodes, and further comprising having each of the peer nodes subtract out its own audio content.

19. The computer-implemented process as set forth in claim 12, further comprising:

fully connecting the peer nodes to define a clique; and organizing a network topology such that the clique behaves as one of: (a) a super gateway node that interacts with other nodes outside of the clique; (b) a super server such that the clique is in a position of a server in a star network topology interacting with client nodes outside of the clique.

20. A peer-to-peer audio communication system for engaging in a multi-party real-time audio communication session between peer nodes in a peer-to-peer network, comprising:

an audio packet module that divides an input audio stream having audio content into a plurality of audio frames;

an audio mixer that performs mixing of the audio frames from each of the peer nodes at a particular frame to produce a mixed audio packet at each of the plurality of audio frames;

a round robin processing technique that rotates audio mixing and redelivery of the mixed audio content one at a time on a frame-by-frame basis to each of the peer nodes in a round robin manner; and an audio decoder that decodes the redelivered mixed audio content to obtain audio for the audio communication session.

* * * * *